US009330485B2

(12) United States Patent
Wahrenberg

(10) Patent No.: US 9,330,485 B2
(45) Date of Patent: May 3, 2016

(54) VOLUME RENDERING OF MEDICAL IMAGES

(71) Applicants: KABUSHIKI KAISHA TOSHIBA, Tokyo (JP); Toshiba Medical Systems Corporation, Otawara-shi (JP)

(72) Inventor: Magnus Wahrenberg, Edinburgh (GB)

(73) Assignees: KABUSHIKI KAISHA TOSHIBA, Tokyo (JP); TOSHIBA MEDICAL SYSTEMS CORPORATION, Otawara-shi (JP)

(*) Notice: Subject to any disclaimer, the term of this patent is extended or adjusted under 35 U.S.C. 154(b) by 359 days.

(21) Appl. No.: 13/771,460

(22) Filed: Feb. 20, 2013

(65) Prior Publication Data
US 2014/0232719 A1 Aug. 21, 2014

(51) Int. Cl.
*G06T 15/08* (2011.01)
*G06T 15/50* (2011.01)

(52) U.S. Cl.
CPC ............... *G06T 15/08* (2013.01); *G06T 15/506* (2013.01); *G06T 2210/41* (2013.01)

(58) Field of Classification Search
CPC .... G06T 15/08; G06T 15/506; G06T 2210/41
See application file for complete search history.

(56) References Cited

U.S. PATENT DOCUMENTS

| | | | |
|---|---|---|---|
| 5,911,691 A * | 6/1999 | Mochizuki et al. | 600/443 |
| 2010/0160789 A1* | 6/2010 | Dilworth et al. | 600/476 |
| 2012/0026169 A1* | 2/2012 | Bernhardt et al. | 345/424 |

FOREIGN PATENT DOCUMENTS

JP 9-237352 9/1997

OTHER PUBLICATIONS

Ernest V. Garcia, et al., "Quantification of Rotational Thallium-201 Myocardial Tomography", Journal of Nuclear Medicine, vol. 26, No. 1, Jan. 1985, pp. 17-26.

* cited by examiner

*Primary Examiner* — Ke Xiao
*Assistant Examiner* — Raffi Isanians
(74) *Attorney, Agent, or Firm* — Oblon, McClelland, Maier & Neustadt, L.L.P

(57) ABSTRACT

Certain embodiments provide a photo-realistic rendering apparatus and method. An illumination model is used that includes placing a synthetic or virtual light source adjacent a region of tissue of interest in order to visualize the thickness of the tissue by modeling how light from the virtual light source interacts with the tissue of interest, through effects including absorption and scattering, as light emitted from the light source travels through the tissue of interest to a view point of view plane. It is simulated how some light is absorbed making tissue regions that are thicker darker (since more of the light is absorbed and the intensity reduces) and more red (since tissue tends to absorb blue and green wavelengths more strongly than red wavelengths and this chromatic effect is incorporated in the illumination model). A 2D image can thus be provided in which the color and intensity of light propagating through the tissue provides visual feedback on the tissue thickness.

22 Claims, 16 Drawing Sheets 1. basal anterior
2. basal anteroseptal
3. basal inferoseptal
4. basal inferior
5. basal inferolateral
6. basal anterolateral
7. mid anterior
8. mid anteroseptal
9. mid inferoseptal
10. mid inferior
11. mid inferolateral
12. mid anterolateral
13. apical anterior
14. apical septal
15. apical inferior
16. apical lateral
17. apex

VOLUME RENDERING OF MEDICAL IMAGES

BACKGROUND OF THE INVENTION

Embodiments described herein generally relate to volume rendering of medical images.

In the medical field, three-dimensional (3D) image data sets, i.e. volume data sets, are collected by a variety of techniques—referred to as modalities in the field—including computer assisted tomography (CT), magnetic resonance (MR), single photon emission computed tomography (SPECT), ultrasound and positron emission tomography (PET).

When displaying an image, such as in medical imaging applications, particular signal values are associated with particular opacities and also, in the case of non-grayscale images, colors to assist visualization. This association or mapping is performed when using data from a 3D data set (voxel data set) to compute a 2D data set (pixel data set) which represents a 2D projection of the 3D data set for display on a computer screen or other conventional 2D display apparatus. This process is known as volume rendering or more generally rendering.

There are various clinical situations in which tissue thickness is an important diagnostic metric. For example, in cardiac imaging the myocardial wall thickness is used as an indicator of hypertrophy.

FIG. 1 shows a schematic section of a healthy heart on the left and a heart with right ventricular hypertrophy on the right. As can be seen the ventrical wall V is thicker in the diseased heart.

In a volume rendering application for visualizing a 3D patient image data set, the wall thickening can be seen by taking a section through the heart as in the schematic illustration, but creating this view can be quite time consuming. However, without taking a section, it is not straightforward to visualize thickness metrics or to fuse them with the structural data.

One known method is to project the thickness measurement onto the heart wall as a texture—this is a feature of Toshiba Medical Systems CT Console.

FIG. 2 is a flow diagram explaining this method of visualizing the thickness of the myocardium.

In Step S1, segmentation of a CT volume data set of the heart is carried out to identify the compartments and other features.

In Step S2, a thickness map of the myocardium is computed.

In Step S3, the thickness is mapped to colors.

In Step S4, the modified volume data set is volume rendered using the color mapping of the thickness as a texture on the external surface of the myocardium.

In Step S5, the 2D image from the volume rendering is output for display.

This method works rather well but, since the texture is artificial, the volume rendered image appears artificial to the user.

A somewhat related method is disclosed in JP 09-237352A for visualizing the rough internal surface of a lumen (or organ), such as the trachea, esophagus, intestines or stomach. It is proposed to modify a conventional external view of the lumen by shading the outside surface of the lumen with the properties of the inside surface of that lumen. The inside surface topography is determined by providing a virtual light source inside the feature. A line light source following the centroid of each slice of a data volume is proposed as the virtual light source, i.e. a point light source in the center of each slice. This allows the topography, i.e. roughness, of the internal surface of the stomach, trachea etc. to be measured and then, by a suitable transform, visualized on the external surface of the stomach, trachea etc. We note the authors understanding of JP 09-237352 A by Hitachi Medical Corp. is solely based on a machine translation into English from the Japanese, so may not be correct.

A common, more conventional method is not to use a rendering application to assess the myocardial viability, but instead to use a so-called polar map or bull's eye plot as proposed by E. Garcia, K. V. Train, J. Maddahi, F. Prigent, J. Friedman, J. Areeda, A. Waxman, and D. Berman, "Quantification of rotational thallium-201 myocardial tomography," Journal of Nuclear Medicine, vol. 26, no. 1, pp. 17-26, 1985. A polar map represents the 3D volume of the left or right ventricle as a 2D circular plate divided into four concentric rings to create 17 regions in total.

FIG. 3 is a polar map of the left ventricle following the American Heart Association (AHA) recommendation. Each region of the display, corresponding to a specific region of the myocardium (see FIG. 3 for the names of the regions), receives a color according to normalized count values. The polar map has been widely used in clinical practice in the last two decades. The AHA standards allow a comparison to be made between different modalities, including SPECT. The bull's eye plot lacks the advantage of a single fused view that in principle should be achievable by volume rendering, but provides an easy way to make a diagnosis.

BRIEF DESCRIPTION OF THE DRAWINGS

Embodiments of the invention are now described by way of example only with reference to the following drawings.

DETAILED DESCRIPTION

Figure 1:
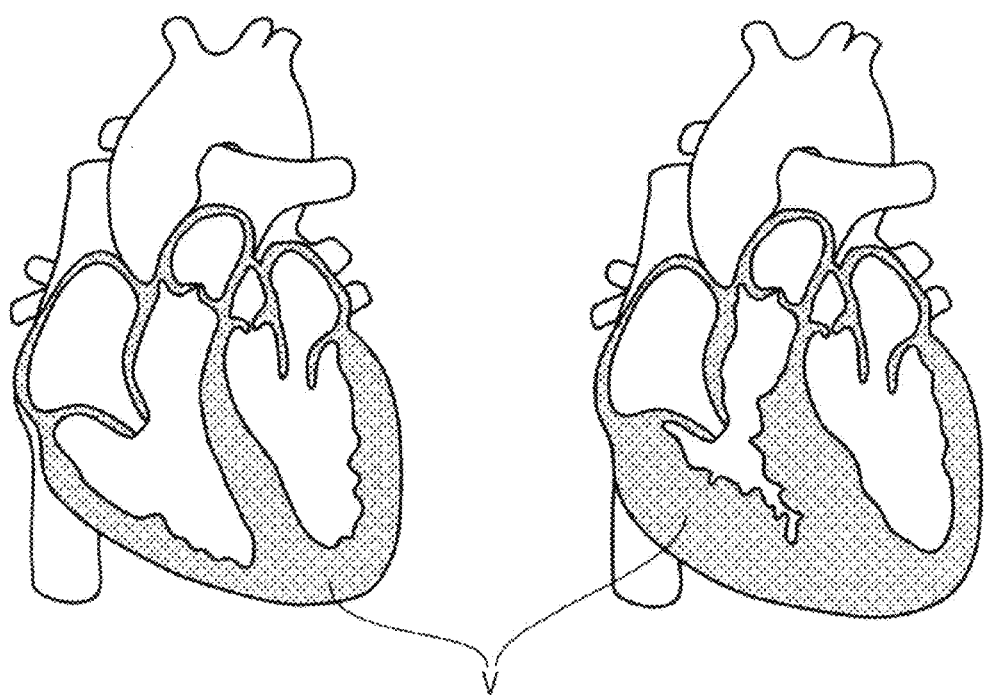
FIG. 1 shows a schematic section of a healthy heart on the left and a diseased heart on the right.
Figure 2:
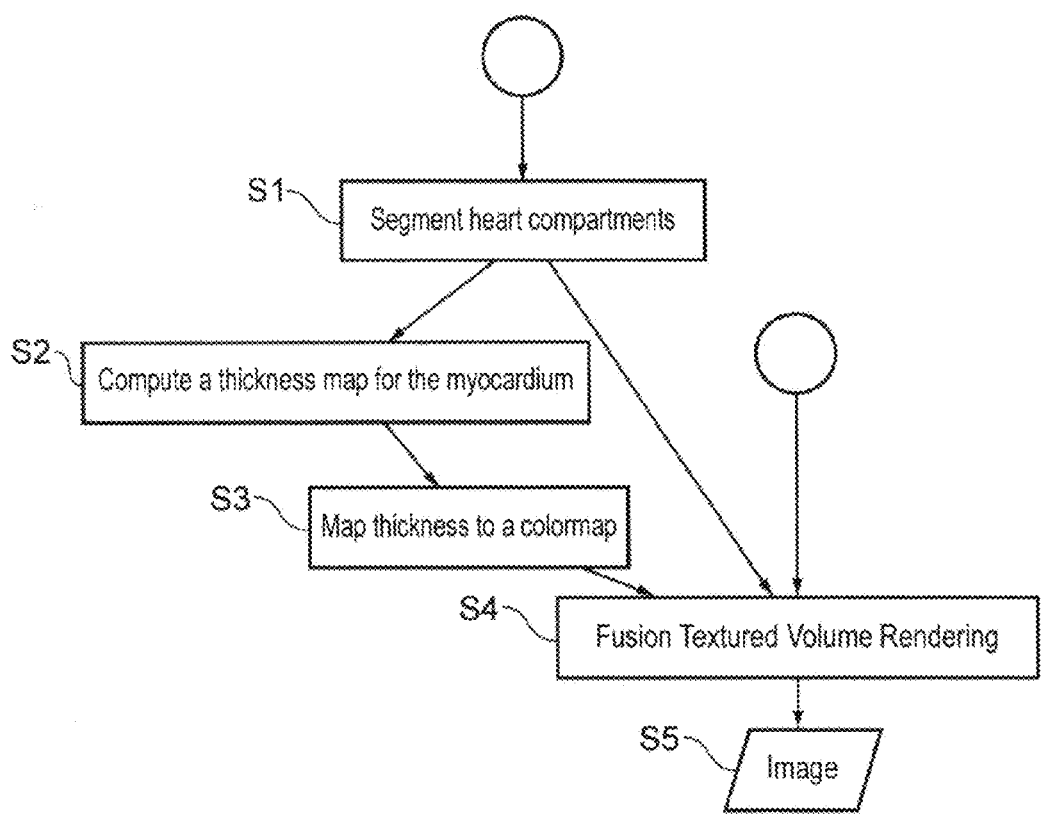
FIG. 2 is a flow diagram explaining a known method of visualizing the thickness of the myocardium.
Figure 3:
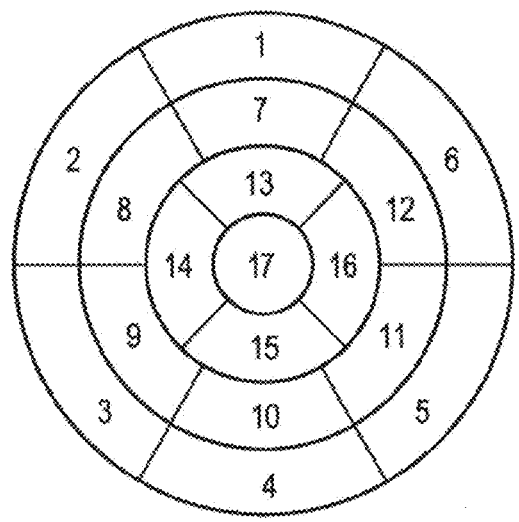
FIG. 3 is a polar map of the left ventricle following the American Heart Association (AHA) recommendation.

Certain embodiments of the invention provide a computer apparatus comprising: memory; a processor; a display; a network output connection and a rendering application loaded in the memory operable to cause the computer apparatus to:
a) load a three-dimensional patient image data set of voxels which forms a scene for processing by the rendering application;
b) assign one or more of the voxels to act as a light source, wherein said voxels are adjacent a region of tissue of interest;
c) render an image of the scene from the perspective of a view point or view plane by calculating how light emitted from the light source voxel(s) travels through the tissue of interest to the view point or view plane using an optical model which includes absorption and scattering; and
d) show the image on the display and/or store the image in the memory and/or output the image to the network output connection.

Certain embodiments of the invention provide a computer-automated method for computing images from a patient image data set, the method comprising:
a) running a rendering application on a computer apparatus;
b) loading a three-dimensional patient image data set of voxels which forms a scene for processing by the rendering application;
c) assigning one or more of the voxels to act as a light source, wherein said voxels are adjacent a region of tissue of interest; and
d) rendering an image of the scene from the perspective of a view point or view plane by calculating how light travels from the light source voxel(s) through the tissue of interest to the view point or view plane using an optical model which includes scattering and absorption; and
e) displaying and/or storing the image.

Certain embodiments of the invention provide a non-transitory computer program product storing the rendering application for performing the above method.

Certain embodiments of the invention provide an image acquisition device loaded with and operable to execute the rendering application for performing the above method.

We propose a photo-realistic rendering apparatus and method with a novel illumination model that includes placing a synthetic or virtual light source adjacent a region of tissue of interest in order to visualize the thickness of the tissue by modeling how light from the virtual light source interacts with the tissue of interest, through effects such as absorption and scattering, as light emitted from the light source travels through the tissue of interest to a view point of view plane. In particular, as light from the virtual light source passes through the tissue of interest, it can be simulated how some is absorbed making tissue regions that are thicker darker (since more of the light is absorbed and the intensity reduces) and more red (since tissue tends to absorb blue and green wavelengths more strongly than red wavelengths and this chromatic effect is incorporated in the illumination model). A 2D image can thus be provided in which the color and intensity of light propagating through the tissue provides visual feedback on the tissue thickness.

The absorption can be calculated using an absorption function which has color dependent absorption parameters. In some embodiments, the color dependent absorption parameters provide stronger absorption for blue and green color components than for a red color component, which mimics real-world transillumination of tissue with white light.

The rendering in some embodiments comprises: a pre-computation, which is independent of the view point or view plane, to calculate for each voxel the amount of light received from the light source and its direction of incidence; followed by a computation of irradiance reaching the view point or view plane, so that movement of the view point or view plane during a session can re-use the pre-computation. For a straightforward implementation, the light source voxels are treated as transparent in the rendering so they do not contribute to scattering or absorption.

The light source is preferably distributed, i.e. not a point source. In other words, there is a plurality of light source voxels which are distributed over a volumetric region.

The light source voxels can be assigned based on a segmentation of the patient image data set either directly with a one-to-one mapping or starting from a segmented volume which is then transformed, e.g. contracted, dilated or translated.

In some embodiments, the light source voxels are assigned with reference to a lumen center line such as the center line of a vessel or intestine.

In some embodiments, when the region of tissue of interest is hollow, the light source voxels lie inside that region, and the view point or view plane is located outside that region so that the light source is obscured by the tissue of interest. In other embodiments, when the region of tissue of interest is hollow, the light source voxels lie outside that region, and the view point or view plane is located inside that region so that the light source is obscured by the tissue of interest.

In some embodiments, the light source voxels can be assigned using drawing tools by the user, i.e. by input from the graphical user interface.

It will usually be desirable to provide at least one additional light source remote from the tissue of interest to provide general illumination of the scene.

Figure 4:
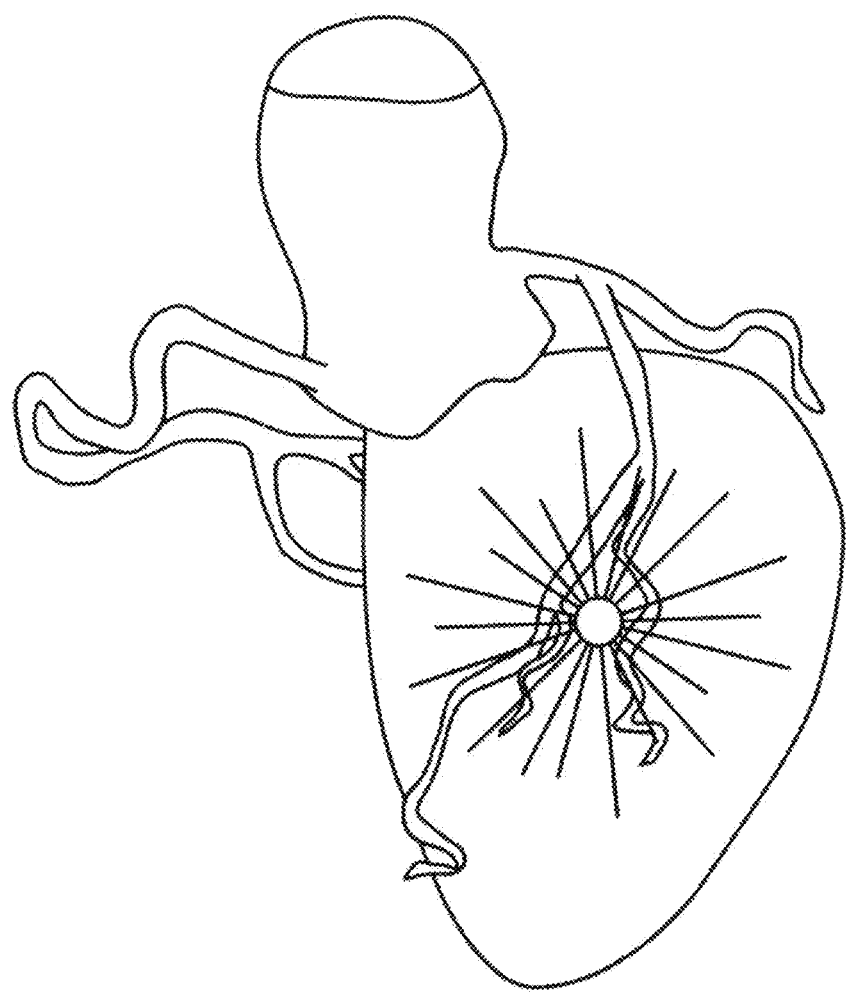
FIG. 4 is a schematic view of the heart with a virtual point light source arranged inside the heart approximately at the centroid.

FIG. 4 is a schematic view of the heart with a virtual point light source arranged inside the heart approximately at the centroid.

By positioning the light source inside tissue of interest, we mean within a defined inner space, for example as known from the segmentation. Examples of inner spaces include: a ventricle, an atrium, a lung cavity, the skull, and a marrow-filled bone cavity, a blood vessel (e.g. artery or vein), intestine, colon or marrow bone (e.g. femur).

A ventricle is defined as a small cavity or chamber within a body or organ and in particular is used to refer to the left and right heart ventricles, but also to cavities of the brain.

An atrium is defined as a body cavity or chamber and in particular is used to refer to the left and right atriums of the heart.

A lumen is defined as the inner open space or cavity of a tubular organ, such as a blood vessel, artery or vein, or an intestine or the colon.

By positioning the light source behind tissue of interest, we mean positioning the tissue of interest between the viewpoint and the light source such that there is no direct line of sight from the viewpoint to the light source.

It is noted that further embodiments envisage placing the viewer, i.e. the viewpoint or view plane, inside an inner space bounded by a region of tissue of interest, such as inside an intestine or other lumen, and positioning the light source outside the region of tissue of interest, so that light travels from outside in, e.g. from outside the lumen to a viewer inside the lumen. This viewing mode may be useful for virtual colonoscopy, for example.

Compared with texture-based, shading-based or internal roughness-based approaches which are used to artificially modify the appearance of the external surface of an organ, the subjective impression of the images produced using the rendering method with novel illumination model proposed herein is that they are insensitive to noise in the image data, and that they provide a photo-realistic view that gives the viewer a perception of high image quality.

The proposed use of a virtual light source for allowing a user to understand and appreciate thickness and thickness variations of tissue is the virtual analog of what is called transillumination in the real world. We therefore refer to our rendering method as virtual transillumination.

Absorption and scattering of light are very natural optical phenomena and as such images produced by a suitable illumination model incorporating these effects can deliver an image from which a user can intuitively assess tissue thickness.

Our investigations show that if a point light source is used, in some applications there can variations in lighting which mean that a reliable indication of thickness is not always given. Whether this is an issue depends on the shape of the inner space and its surrounding tissue which is to be transilluminated. This undesired effect arises when variations in the position of the point light source result in significant changes in the path length through the tissue in a straight line from the light source point and the view point.

One way to avoid the possibility of this issue is not to use a point light source, but rather to use a binary volume as the light source, i.e. a volumetric region made up of one or more volumes known from the segmentation to lie adjacent (e.g. inside, outside or behind) the tissue of interest. Taking the example where it is desired to transilluminate the myocardium, we take the segmented endocardium and blood pool of the left and/or right ventricles and make these segmented volumes emit light. By defining a whole volume as the virtual light source, highly uniform lighting conditions can be provided, which ensures an accurate representation of wall thickness and an intrinsic normalization from patient to patient.

Figure 5:
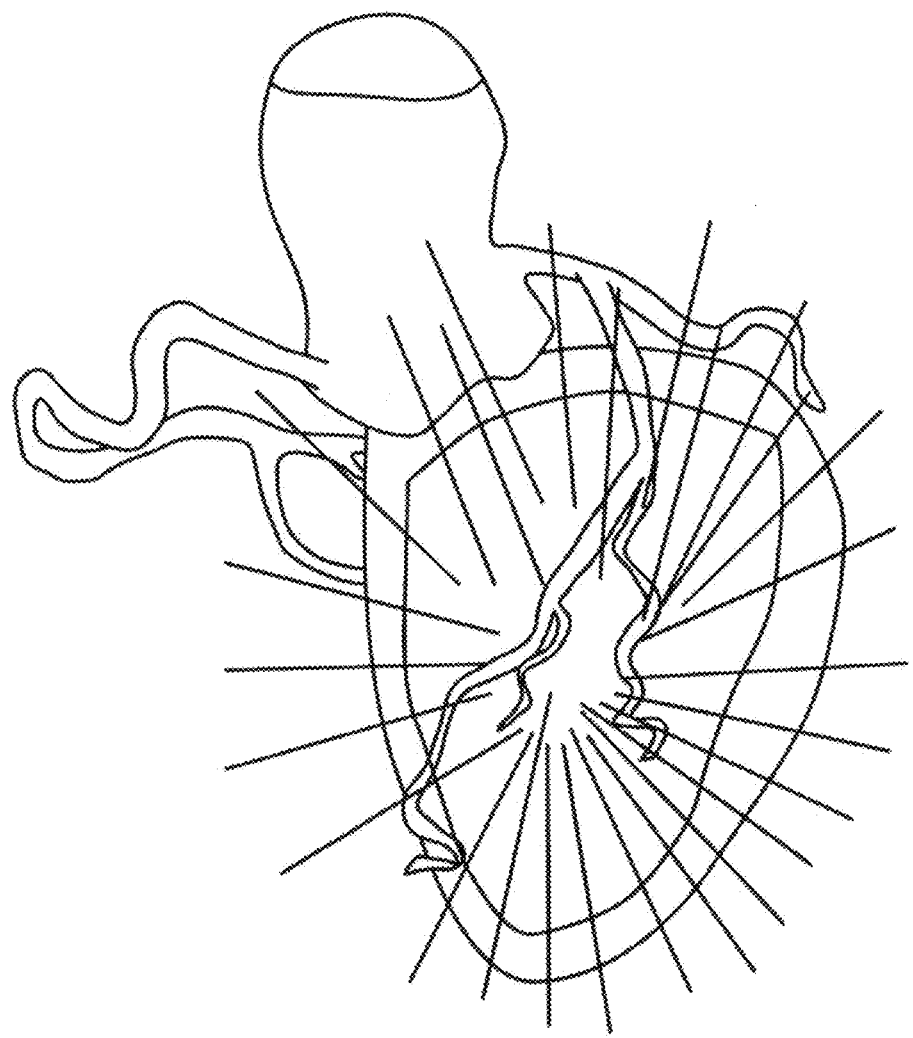
FIG. 5 is a schematic view of the heart with a virtual light source arranged to fill a binary volume inside the heart defined by a volume inside the endocardium.

FIG. 5 is a schematic view of the heart with a virtual light source arranged to fill a binary volume inside the heart defined by a volume inside the endocardium.

Another similar approach would be to define a point (e.g. centroid of a segmented organ) or line (e.g. center line of the colon, blood vessel or other lumen) light source, and then expand the point or line into a spherical or sleeve-like region respectively, for example: until one point in the expanded volume reached the edge of the binary volume containing the original point or line; for a proportion of the distance between the point or line and the adjacent boundary of the tissue of interest; or more simply for a fixed length.

Yet another approach is to allow the user to manually define the location and extent of the virtual light source. To achieve this, the user can use standard CAD drawing tools to define the volume which is to become luminous. The user can also adjust the shape, size and location of the virtual light source until the desired impression is achieved.

The illuminated voxels may also be in a layer or sleeve, such as defined by a segmented feature such as a displaced, dilated or shrunken surface defined by the walls of a lumen or organ, for example a surface which is shrunk from the endocardium, or a sleeve-like structure shrunk from the walls of a blood vessel, or a sheet which is derived from the skin, but translated to lie under the skin. Such layers or sleeves could be represented by a surface mesh.

It is envisaged that in most embodiments, the voxels contained in the binary volume that is the virtual light source are set to be fully transparent, so they do not interact with the emitted photons from the virtual light source. If that were not the case, there would be some complex effects internal to the illuminated volume, which in principle could be of additional diagnostic value, but without detailed understanding are likely merely to give the impression of undesirable artifacts.

Virtual transillumination as proposed herein is applicable for visualizing the relative thickness of a wide variety of features, including: the heart, airways, the colon, bone and skull, blood vessels and skin.

The images produced for the user are perceived to have high image quality. This is in part because of the photorealistic nature of transillumination, which provides an intuitive impression, unlike schemes which show thickness as a surface texture. The perceived high image quality is also in part a result of a quantitative benefit that the transillumination approach is relatively insensitive to noise owing to its aggregating nature. Taking account of single or multiple scattering of photons emitted by the virtual light source also contributes to the photo-realistic nature of the images produced.

A user understands transillumination intuitively, even from personal experience such as shining a flashlight through the fingers or putting it in the mouth, and knows that a bright area is thin, a red tinted area is thicker and a darker area is even thicker.

Figure 6:
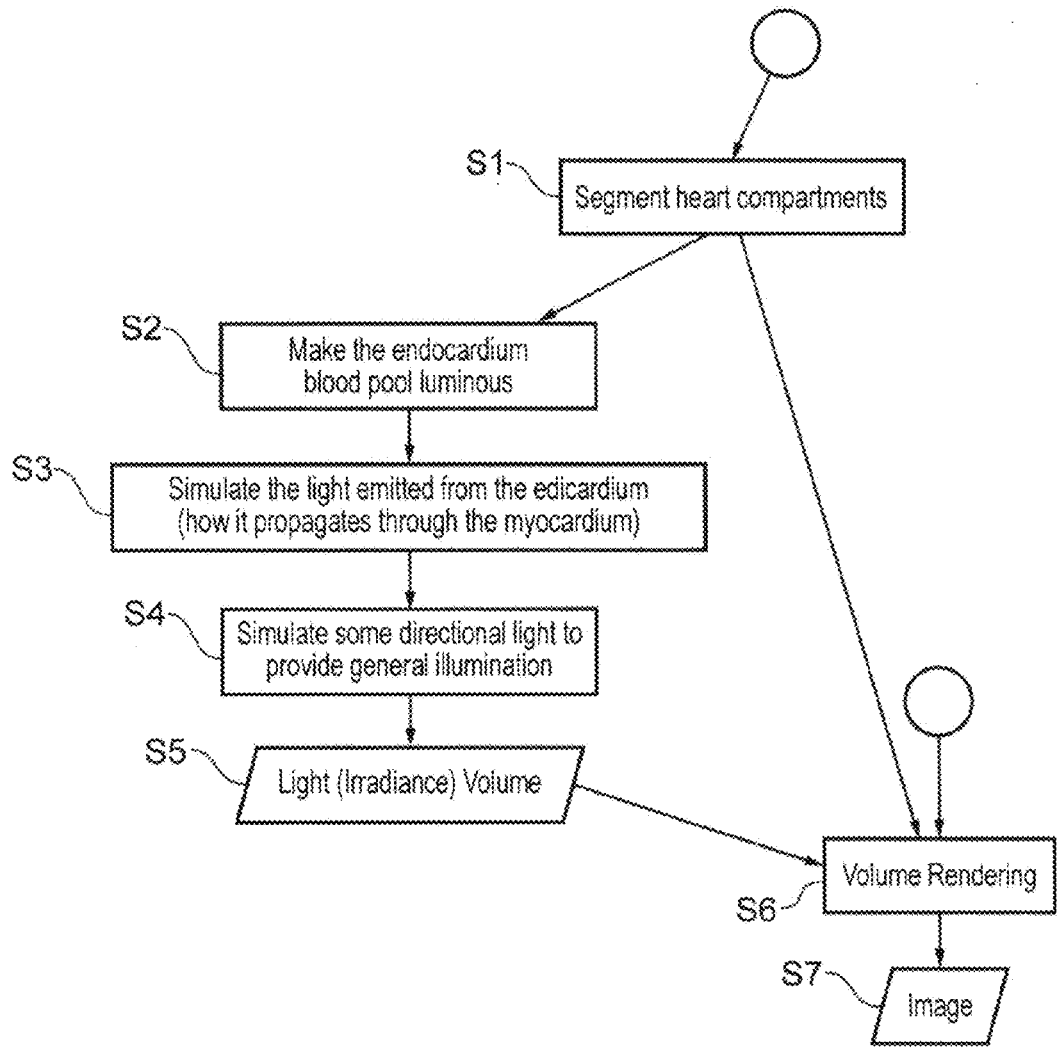
FIG. 6 is a flow diagram of an example based on visualizing the thickness of the myocardium.

FIG. 6 is a flow diagram of an example based on visualizing the thickness of the myocardium.

In Step S1, segmentation of a CT volume data set of the heart is carried out to identify the compartments and other features.

In Step S2, an interior volume in the heart is made luminous. For example, the voxels of the blood pool can be made luminous, e.g. the chambers constituted by the left and right ventricles. Another example would be to make all voxels inside the endocardium luminous.

In Step S3, the transillumination effect is achieved by applying an illumination model to trace how light from the virtual light source passes through the image data set and on the way how the light is modified by its interaction with the tissue being transilluminated, i.e. the myocardium in this example. For the transillumination, we use an optical model that incorporates reflection, scattering and absorption. We now describe the illumination model in more detail with reference to the viewpoint, which may be considered to be a camera, or other light sensor, or an eye.

Figure 7:
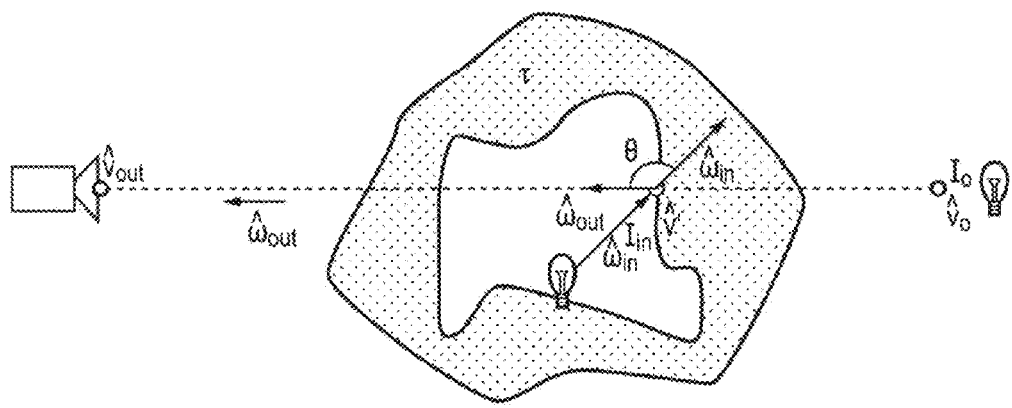
FIG. 7 is a schematic figure helping to define the nomenclature used in the mathematical description of the illumination model in which two light sources are schematically illustrated as filament light bulbs, the viewpoint as a camera, and the tissue of interest with shading.

FIG. 7 is a schematic figure helping to define the nomenclature used in the following. It attempts to very roughly show a scene to be rendered that contains a generic hollow feature, i.e. a feature in which a virtual light source has been placed inside, such as the heart or a vessel. Two light sources are schematically illustrated as filament light bulbs. One is an external light source outside the volume of interest (right hand side of figure) and the other is a light source arranged inside the volume of interest. For a single point $\hat{v}$ some of the incoming light $I_{in}$ from the internal light source incident in direction $\hat{\omega}_{in}$ is scattered or reflected by an angle θ along the ray to the camera in direction $\hat{\omega}_{out}$. $I_0$ represents the irradiance received from the back of the object directly from an external light source. A viewpoint at position $\hat{v}_{out}$ is schematically illustrated as a camera on the left hand side of figure. We define $I_{out}$ as the irradiance that is passed in the direction of the ray trace (dotted line) to the camera $\hat{\omega}_{out}$ from position $\hat{v}$. The tissue being transilluminated (e.g. myocardium) is shaded gray and has an extinction coefficient τ. It will be understood that in some viewing modes, there may be a small, point-like viewpoint as schematically shown in FIG. 7, or a pair of viewpoints one for each eye of a viewer—for example if the rendering is for a virtual reality headset or glasses, whereas in other viewing modes for producing a complete 2D picture of the whole of a region in the patient image data set, e.g. the whole thorax, or the heart and immediately surrounding tissue, there will be an extended view plane.

Figure 8A:
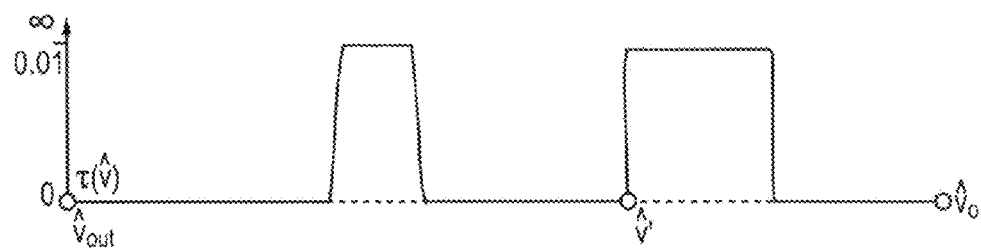
FIG. 8A is a graph showing the extinction coefficient $\tau(\hat{v})$ along the ray in FIG. 7.

FIG. 8A is a graph showing the extinction coefficient $τ(\hat{v})$ along the ray in FIG. 7 showing that in the transilluminated tissue there is non-zero absorption.

Figure 8B:
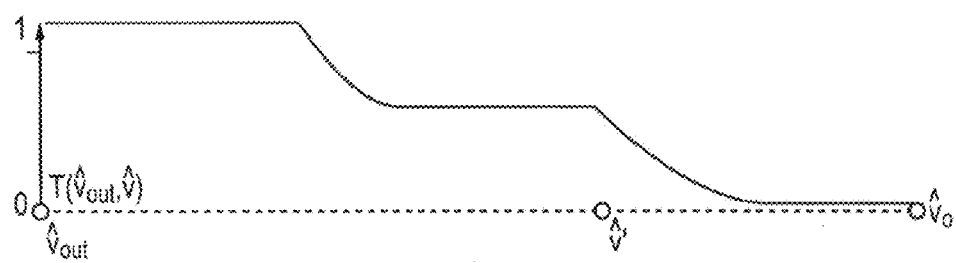
FIG. 8B is a graph showing how a dimensionless visibility ratio $T(\hat{v}_{out}, \hat{v})$ representing the fraction of radiation that reaches the camera from the external light source along the ray in FIG. 7.

FIG. 8B is a graph showing how a dimensionless visibility ratio $T(\hat{v}_{out}, \hat{v})$ representing the fraction of radiation that reaches the camera along the ray in FIG. 7 varies in the path between the camera and the external light source as a result of interaction with the transilluminated tissue.

Irradiance can be spectral irradiance specific for each wavelength or the total irradiance across the entire spectrum. When producing color images the irradiance will be separated into light components, such as red, green and blue, for an additive color model. Hence, for color images, the following equation should be interpreted as being for a specific color component (they would as such be replicated for each color component).

$$I_{out}(\hat{v},\hat{\omega}_{out}) = s(\hat{v},\hat{\omega}_{in},\hat{\omega}_{out})I_{in}(\hat{v},\hat{\omega}_{in}) + I_e(\hat{v})$$

This function defines for a single point $\hat{v}$ how much light is emitted $I_e$ and how much of the incoming light $I_{in}$ from direction $\hat{\omega}_{in}$ is scattered/reflected in direction $\hat{\omega}_{out}$. This expression only applies for single scattering from a single light source.

The scattering function s can be defined as the product of the extinction coefficient τ and the particle albedo A, which represents how much of the light is absorbed as the light is scattered/reflected (how black the surface is), and the phase function.

$$s(\hat{v},\hat{v}_{in},\hat{v}_{out}) = A(\hat{v})τ(\hat{v})p(\hat{v},\hat{v}_{in},\hat{v}_{out})$$

The phase function defines how the incoming light is distributed in each direction. Within heterogeneous material this optical property can be modeled with Mie scattering which assumes the medium to be a set of randomly distributed spherical particles. When the particle size is on the same order as the wavelength of light we can approximate the scattering using the Henyey-Greenstein function.

$$p(θ) = \frac{1}{4π} \frac{1-g^2}{(1+g^2-2g\cos(θ))^{3/2}}$$

$$θ = |\hat{\omega}_{in} - \hat{\omega}_{out}|$$

where g∈(−1,1) is a constant that defines the scattering characteristics.

Figure 9:
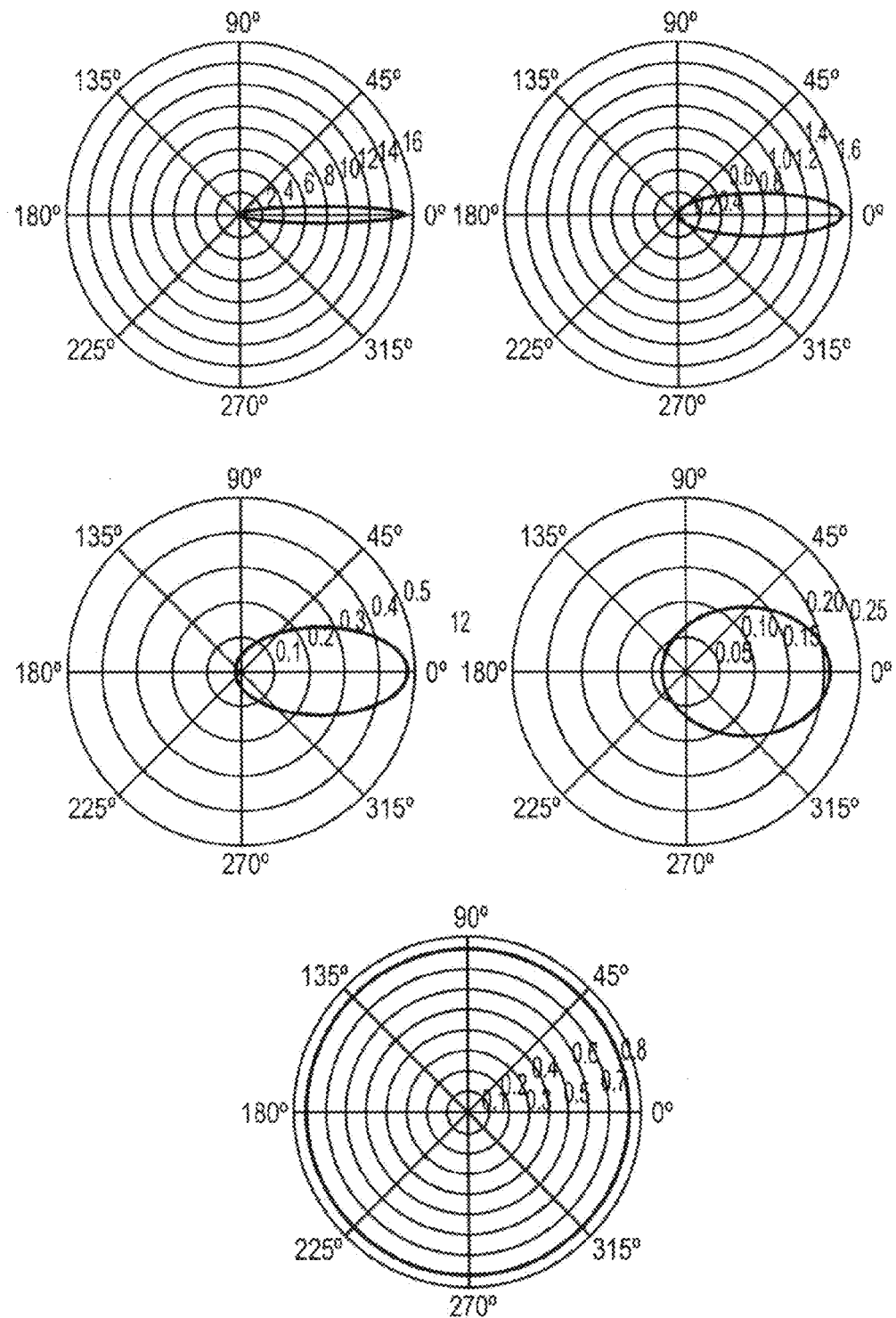
FIG. 9 shows five plots representing the Henyey-Greenstein function with various values of the parameter g.

FIG. 9 shows five plots representing the Henyey-Greenstein function with various values of g namely from left to right g=[0.9, 0.7, 0.5, 0.3, 0]. Negative numbers will produce the same shape, but in the backwards direction.

Using the Henyey-Greenstein function is just one example. Another common function for particles larger than the wavelength of light can be defined according to Lambert's law:

$$p(θ) = \frac{8}{3π}(\sin θ + (π - θ)\cos θ)$$

Figure 10:
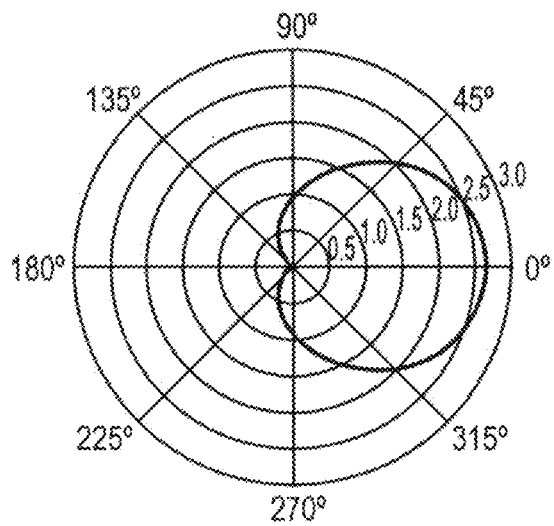
FIG. 10 is a plot representing the Lambert's law function.

FIG. 10 is a plot representing the Lambert's law function.

A similar function is also used for reflection where it can be specified in relation to the surface normal N often defined as the scalar field gradient $$N = \frac{\nabla f}{\|\nabla f\|}.$$

A simple example is the diffuse reflection also defined by Lambert's law:

$$p(\hat{v},\hat{\omega}_{in},\hat{\omega}_{out}) = \max(0, \hat{\omega} \cdot N)$$

For maximum realism both reflection and scattering (transmittance) can be incorporated in the function $p(\hat{v}, \hat{\omega}_{in}, \hat{\omega}_{out})$. All examples above are models and approximation—more sophisticated models can also be used for transillumination.

The above description describes how we can model the light interaction for a single point.

The accumulative expression for how much light is received at the camera is defined as the following:

$$I_{pix}(\hat{v}_{out}, \hat{\omega}_{out}) = I_0 T(\hat{v}_0, \hat{v}_{out}) + \int_{\hat{v}=\hat{v}_0}^{\hat{v}_{out}} I_{out}(\hat{v}, \hat{\omega}_{out}) T(\hat{v}, \hat{v}_{out})$$

In this equation $I_{pix}$ represents the final irradiance reaching the pixel on the camera plane. $I_0$ represents the irradiance received from the back of the object directly from an external light source. Most of the time $I_0$ is 0 for the transillumination scene. The integral in the function can be interpreted as the sum of the amount of light received from each point along the viewing line, attenuated on its way to the camera by T. Another way to look at T is that it defines the visibility of $\hat{v}_a$ from $\hat{v}_b$.

$$T(\hat{v}_a, \hat{v}_b) = e^{-\int_{\hat{v}=\hat{v}_a}^{\hat{v}_b} τ(\hat{v})}$$

In the description so far one part of the function has been omitted, namely $I_{in}$. $I_{in}$ is recursive and defined similarly to $I_{pix}$. For the single scattering case we do not need to take scattering into account for $I_{in}$ so the equation is slightly less complicated than $I_{pix}$ but they essentially represent the same thing. $I_D$, $\hat{v}_D$ here is the position of the light source or where $\hat{\omega}_{in}$ enters the scene.

$$I_{in}(\hat{v}, \hat{\omega}_{in}) = I_D T(\hat{v}_D, \hat{v}) + \int_{\hat{v}=\hat{v}_D}^{\hat{v}} I_e(\hat{v}) T(\hat{v}, \hat{v}_{out})$$

When we allow for multiple scattering, two of the functions become more complex. Dealing with scattering we now have to take into account light scattered from any direction as defined below. It is noted that this version of $I_{out}$ also applies for cases where there are multiple light sources or volumetric single light sources, and also applies for both single scattering and multiple scattering.

$$I_{out}(\hat{v}, \hat{\omega}_{out}) = \left( \int_{\hat{\omega}_{in}=0}^{2\pi} s(\hat{v}, \hat{\omega}_{in}, \hat{\omega}_{out}) I_{in}(\hat{v}, \hat{\omega}_{in}) \right) + I_e(\hat{v})$$

The simplified $I_{in}$ also becomes much more complicated since we have to define it as the full recursive integral:

$$I_{in}(\hat{v}, \hat{\omega}_{in}) = I_D T(\hat{v}_D, \hat{v}) + \int_{\hat{v}=\hat{v}_D}^{\hat{v}} I_{out}(\hat{v}, \hat{\omega}_{in}) T(\hat{v}_D, \hat{v})$$

This allows for light to scatter freely from every direction everywhere in the volume. Mathematically, the extension to the integral is not a significant complication, but the increase in computational complexity is enormous.

To achieve interactive visualization using this model, i.e. browsing in real time, it is often desirable to pre-compute $I_{in}(\hat{v}, \hat{\omega}_{in})$ to reduce the amount of computation required on the fly. For single scattering and using one light source the angular component is not required and even for multiple scattering it is possible to pre-compute $\int_{\hat{\omega}_{in}=0}^{2\pi} I_{in}(\hat{v}, \hat{\omega}_{in})$ and approximate the contribution of $s(\hat{v}, \hat{\omega}_{in}, \hat{\omega}_{out})$. Essentially we want to find a function $\acute{s}$ so that:

$$\int_{\hat{\omega}_{in}=0}^{2\pi} s(\hat{v}, \hat{\omega}_{in}, \hat{\omega}_{out}) I_{in}(\hat{v}, \hat{\omega}_{in}) \approx \acute{s}(\hat{v}, \hat{\omega}_{out}) \int_{\hat{\omega}_{in}=0}^{2\pi} I_{in}(\hat{v}, \hat{\omega}_{in})$$

The computationally simplest way to do this is to use the Henyey-Greenstein function with g=0 in which case we can move s out of the integral.

$$\int_{\hat{\omega}_{in}=0}^{2\pi} s(\hat{v}, \hat{\omega}_{in}, \hat{\omega}_{out}) I_{in}(\hat{v}, \hat{\omega}_{in}) = s(\hat{v}, 0, \hat{\omega}_{out}) \int_{\hat{\omega}_{in}=0}^{2\pi} I_{in}(\hat{v}, \hat{\omega}_{in})$$

The pre-computation creates an irradiance scalar field which can be represented as a 3D raster, using a multi-resolution tree representation (ex. octree or kd-tree) or even just a point cloud.

In the transillumination simulation we currently use the more complicated $I_{out}$ variant but since we pre-compute $\int_{\hat{\omega}_{in}=0}^{2\pi} I_{in}(\hat{v}, \hat{\omega}_{in})$, the complexity is not greatly increased. We do this because of our preferred implementation in which the principal light source is distributed over a volumetric region, rather than being a point light source localized to a single voxel. The interpretation would be single scattering from multiple sources.

For the virtual transillumination, we use a photon mapping method for volume rendering which is now described. Other optical models could also be used instead of photon mapping.

There are five aspects of photon interaction that form the basis of light simulation.

Emission: New photons are created usually by atomic or solid-state relaxation.

Absorption: All the energy of the photon is transferred to the material. This effect is often highly wavelength dependent.

Reflection: The photon changes direction according to the surface orientation and incidence angle.

Refraction: Refraction only applies to homogenous material. The photon changes direction based on surface orientation, incidence angle and optical index differential.

Scattering: The photon changes direction relative to the propagation direction. This is a purely statistical effect in heterogeneous material. Single/multiple scattering are terms used to describe how many interactions may take place. Scattering is an elastic effect.

The quantity to be mapped is spectral irradiance, or the amount of incoming light energy per wavelength per second. We bin the wavelength into three components (red, green and blue) and we take a unit time interval of 1. From the light source, we start with a certain energy $$\bar{E} = \{E_r, E_g, E_b\}$$

We then trace the photon from the light source as it interacts with the volume to the point where it is absorbed. At this first step we do not try to determine if the individual photons actually reach the camera. The likelihood of that is so small that we would have to simulate far more photons than we would want to manage. In this first step, we are only determining where photons tend to end up.

A. Absorption

For every ray interval, we compute absorption according to an absorption function by subtracting energy using a transfer function $f(v(t), o(t))$ where $v(t)$ is the voxel intensity value and $o(t)$ is the segmentation object as a function of the path parameter t.

$$\bar{E}(t+1) = \bar{E}(t) - f(v(t), o(t))\bar{E}(t)$$

We can also describe this for the continuous case as follows by the Beer-Lambert law.

$$\frac{\partial \bar{E}}{\partial t} = -f(v(t), o(t))\bar{E}(t)$$

The effect we are calculating is a high level photometric effect. For the individual photon the absorption would be a discrete event that happens with a certain probability distribution that can be derived from the equations above. In this case however we can achieve much quicker statistical convergence by treating the traced entity not just as photons, but as bundles of energy representing a large number of photons. We use this trick as much as possible to limit the number of photons, or energy bundles, we have to trace.

B. Reflection and Refraction

The global effects of reflection can be quite substantial. A whole room can be lit by pointing a powerful light at a highly reflective (diffuse) white ceiling. Color can via reflection also bleed between adjacent surfaces, an effect commonly showcased for polygon ray-tracing.

Refraction, sometimes referred to as caustics when combined with reflection, is also an effect can be effectively simulated using photon mapping or other optical models.

In our current implementation, we do not include either reflection or refraction effects in the photon mapping. Reflection is taken into account in the rendering step, which we think is an adequate approximation, since the global effects gained by including reflection in the mapping stage would be very subtle when applied to medical image data. Refraction is not included, since refraction only applies to homogenous material and most tissue types are heterogeneous in composition. Reflection and/or refraction may however be included in other implementations and can be expected to increase the level of photorealism in the images and provide degrees of freedom for illustrative techniques.

C. Scattering

In the photon mapping stage our current implementation does simulate multiple scattering. A simpler implementation would only take account of single scattering.

In our current implementation, single scattering is achieved by simulating absorption combined with a per sample scattering approximation while rendering. Light scattering can be treated as a probability distribution function centered around the light propagation direction. This function, called a phase function, is the scattering analogue of the Bidirectional Reflection Distribution Function (BRDF) for reflection. The scattering distribution function can in some cases be highly wavelength dependent. However, in more dense material, such as most tissue types in medical image data, the dominant chromatic effect is due to absorption so that it is a good approximation to treat scattering as uniform across the spectrum. The concrete phase function used is called the Henyey-Greenstein phase function. Just as the Blinn/Phong model for reflection is an experimentally accurate approximation, so is the Henyey-Greenstein phase function based on experimental data. The function describes the probability that the exitance is scattered in the direction $\theta$.

$$p(\theta) = \frac{1}{4\pi} \frac{1-g^2}{(1+g^2-2g\cos(\theta))^{\frac{3}{2}}}$$

The constant g describes the scattering characteristics and ranges in $[-1, 1]$ where $-1$ is full back-scattering and 1 is full forward scattering (no scattering). In the simulation we treat this effect as stochastic mainly due to the complicated infrastructure required to detach energy into new photons. The number of active photons would increase exponentially as the photons branch continuously. To sample the phase function we need to convert it into a usable from. We do that by defining the cumulative probability distribution function.

$$P(X<x) = \int_0^x p(\theta)$$

From that we can transform a rectangle distribution to the desired phase function distribution. The constant g is in our case not a constant at all but is again provided by a per object transfer function $g(v(t), o(t))$.

D. Filtering

All the stochastic processes used in the photon mapping could be run long enough for their distributions to converge on their own. It is however more efficient to run the processes until the information content is high enough, but smoothness remains low. The distribution can then be smoothed using filtering. Experiments have shown that simple Gaussian filtering provides an excellent base line.

As the information content may vary locally, the filter stage could be made more sophisticated, for example to utilize adaptive Gaussian filtering or diffusion filtering. Filtering is important for making the mapping process progressive. A low quality mapping can be produced by casting fewer photons with higher energy and using a larger $\sigma$ value for the Gaussian filtering. The $\sigma$ value can be defined as a function of photon count $n_p(t)$ and volume size V, namely: $\sigma(n_p(t), V)$.

Having described the illumination model in detail we now describe the further steps of the method.

In Step S4, the optional step is carried out of simulating the effect of an additional light source to provide some general illumination of the scene from outside of the heart. The additional light source could be a point light source located outside the volume to be imaged or an ambient light source, for example.

In Step S5, the spectral irradiance volume is integrated into a ray casting engine.

In Step S6, volume rendering is carried out on the modified volume data set, including the unmodified segments of the volume data set, i.e. in this example, the segments of the volume that are not the heart. At each sample we evaluate the light received through single scattering using the Henyey-Greenstein phase function and through reflection via the phase function (BRDF analog). To estimate the single scattering, we have to know the light direction, or at least an estimate of how much of the light originates from which light source. For a single point light source, this is of course trivial. A practical approximation is to treat reflection as fully diffuse and scattering as locally based on a phase function with g=0. We can still capture the effect of scattering in the tissue by using multiple scattering in the photon mapping stage. Even with these approximations to the photon mapping, the rendering achieves a very high image quality and realism. Rendering with these approximations is also very fast, which is of course a highly desirable characteristic in real time rendering.

The photon mapping provides a good baseline to render diffuse-only gradient-free lighting. When the volume is not too noisy, we can combine the global illumination with local lighting based on the gradient. Local specular lighting with photon-mapped ambient and diffuse is a mode that provides particularly good image quality. The local energy distribution is used to modulate the specular factor so that dark regions hidden in shadow do not emit specular light. The contribution from local/photon mapping is defined by a continuous factor so that one can slide the look from local lighting to global lighting.

It is noted that the voxels of the virtual light source, that is those voxels that are emitters are treated in the rendering as not having any interaction with the photons, i.e. they do not absorb or scatter (or reflect or refract if those interaction effects are included). This can be modeled by setting the opacity of the emitting voxels to zero, or any value which lies outside whatever preset window is used for the transfer function and therefore makes them effectively transparent.

In Step S7, the 2D image from the volume rendering is output for display.

Our results show that the image quality of this rendering method is very good. The extra settings required for the optical modeling to include absorption, scattering and optionally other effects can be combined into presets. No additional per volume adjustments seem to be necessary. A spectral irradiance volume downsized to a quarter of the original size (per axis) has proved to achieve a good balance between performance and quality for both CT image data sets and ultrasound image data sets. The number of photons needed to obtain a good image quality seems to be directly proportional to volume size. We find a personal computer (Dell T5500 with 2.2 GHz processors, 2×4 cores and hyper-threading) is able to achieve close to an interactive level of browsing with directional lighting of CT image data sets. Ambient lighting generally takes much longer to achieve a desirable distribution, but ambient lighting only needs to be updated sporadically, namely when the transfer function changes or spatial features like clipping and segmentation change. Ambient lighting also illuminates more of the volume, making static lighting more acceptable, even when rotating the view. For ultrasound volumes we can achieve interactive light direction changes with rates up to about 10 photon maps per second. Provided the filtering can be done at similar or faster rate, 5-10 photon maps per second should be achieved and delivered to the rendering stage. A good combination is to use baseline ambient lighting computed at the start of the session and then add partial directional lighting to that. Spectral irradiance is additive so progressive techniques tend to be easy to implement. The rendering process, when not combined with local lighting, tends to be slightly faster than using local lighting, since no gradients or lighting needs to be computed in place.

The simulated light source can be any of the following: volumetric light source extending over a voxel region, linear light source extending over a line of voxels, point light source, ambient light source simulated by a fully uniform stochastic process, directional light source, or ambient light source simulated by a hemispherical stochastic ambient model. It will also be appreciated that the best results may be achieved with multiple light sources, such as a volumetric light source to provide the desired transillumination of a specific region of tissue in combination with one or more light sources for general illumination of the transilluminated tissue and adjacent features, which may be point light sources or ambient light sources.

Figure 11:
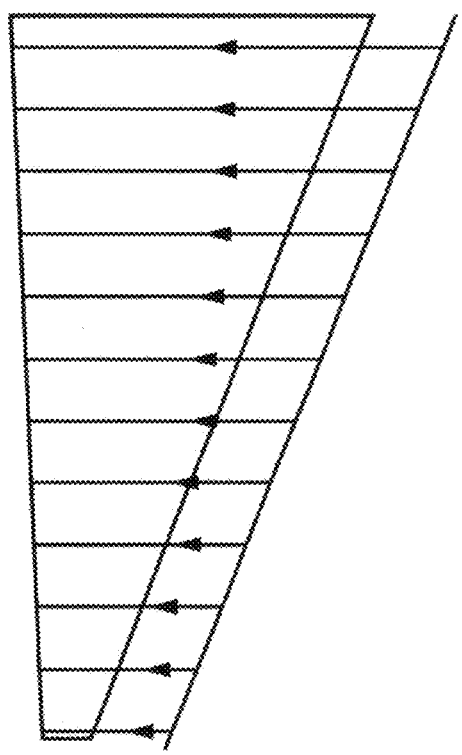
FIG. 11 is a schematic diagram of a simple preset for virtual transillumination.

FIG. 11 is a schematic diagram of a simple preset for the transillumination, where the window width of the preset is set such that the thinnest part of the myocardium appears white or very light red, with perhaps 0-20% absorption, and the thickest part of the myocardium appears dark red or black, with perhaps 80-100% absorption, there being a linear variation in absorption over the window width. The preset may be predetermined, i.e. the maximum and minimum thicknesses are fixed values, or calculated on the fly using thickness calculations taken from the segmented 3D image data set being visualized. The preset may have color aspects to mimic real world transillumination, whereby the virtual light source is white, and the tissue absorption is modeled to preferentially absorb non-red colors, i.e. with absorption parameters for the blue and green components which are higher than for the red component. In this way, there is multi-dimensional feedback to the viewer (color changing white-to-red and intensity changing from high-to-low) in a single parameter (tissue thickness).

A second measurement can also be introduced into the preset, for example by giving it an effect on the color absorption. This second input could be based on density of the tissue, for example the CT voxel values in the myocardium. Moreover, in other cases, second input could come from a different modality such as ultrasound, PET or SPECT. For example, to combine CT with PET in what is predominantly a CT image, the second input could be voxel values in the PET data. The second input might also take another parameter, such as motion as determined frame-to-frame in a time-resolved study.

To assist the diagnosis, the user may be presented with an image from a reference 3D image data set using the same visualization parameters and transillumination preset.

Figure 12:
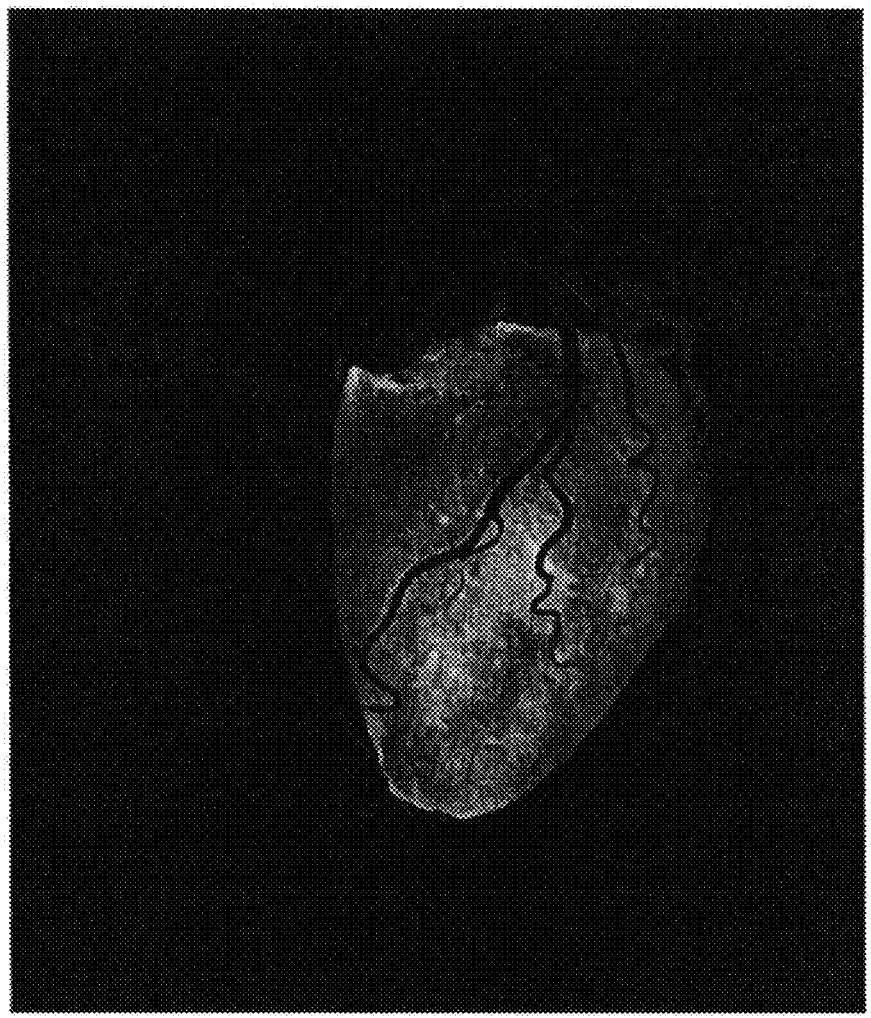
FIG. 12 is an example image of the heart rendered with a lighting model having a virtual light source inside the heart as the sole light source.

FIG. 12 is an example image of the heart with a virtual light source inside the heart as the sole light source in the illumination model.

Figure 13:
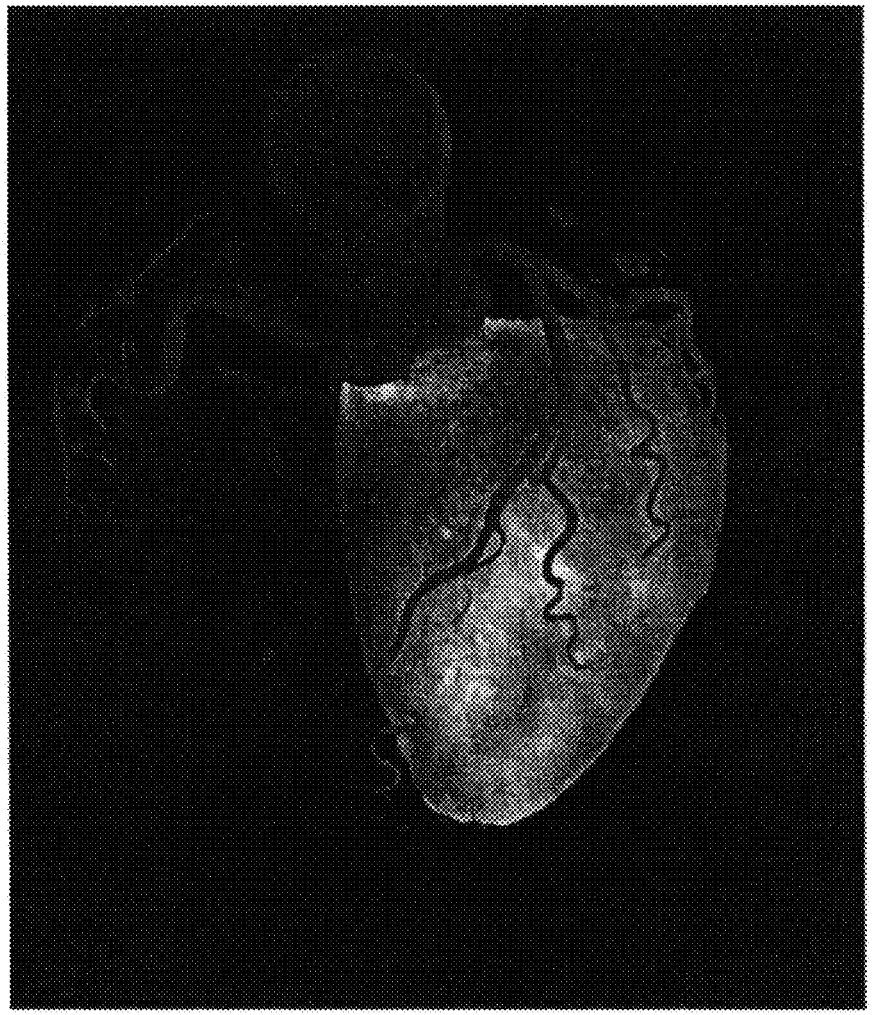
FIG. 13 is an example image of the heart rendered with a lighting model having the same virtual light source inside the heart as in FIG. 12 and also with a further external light source.

FIG. 13 is an example image of the heart with the same virtual light source inside the heart as in FIG. 12, but with a further light source in the form of a conventional, external, non-directional light source to provide some general ambient illumination of the heart from outside.

The photorealistic rendering method with an illumination model that provides a virtual transillumination effect as described above, in particular the method illustrated in FIG. 6, will be implemented in software or in a combination of software and optimized or dedicated hardware, such as graphics cards or chip sets suitable for or optimized to volume rendering. The software will be incorporated in a rendering application which may run on a computer workstation or a server which is part of a network operating under a client-server model. The usual context for the workstation or server on which the rendering application is resident will be a hospital network as now described.

Figure 14:
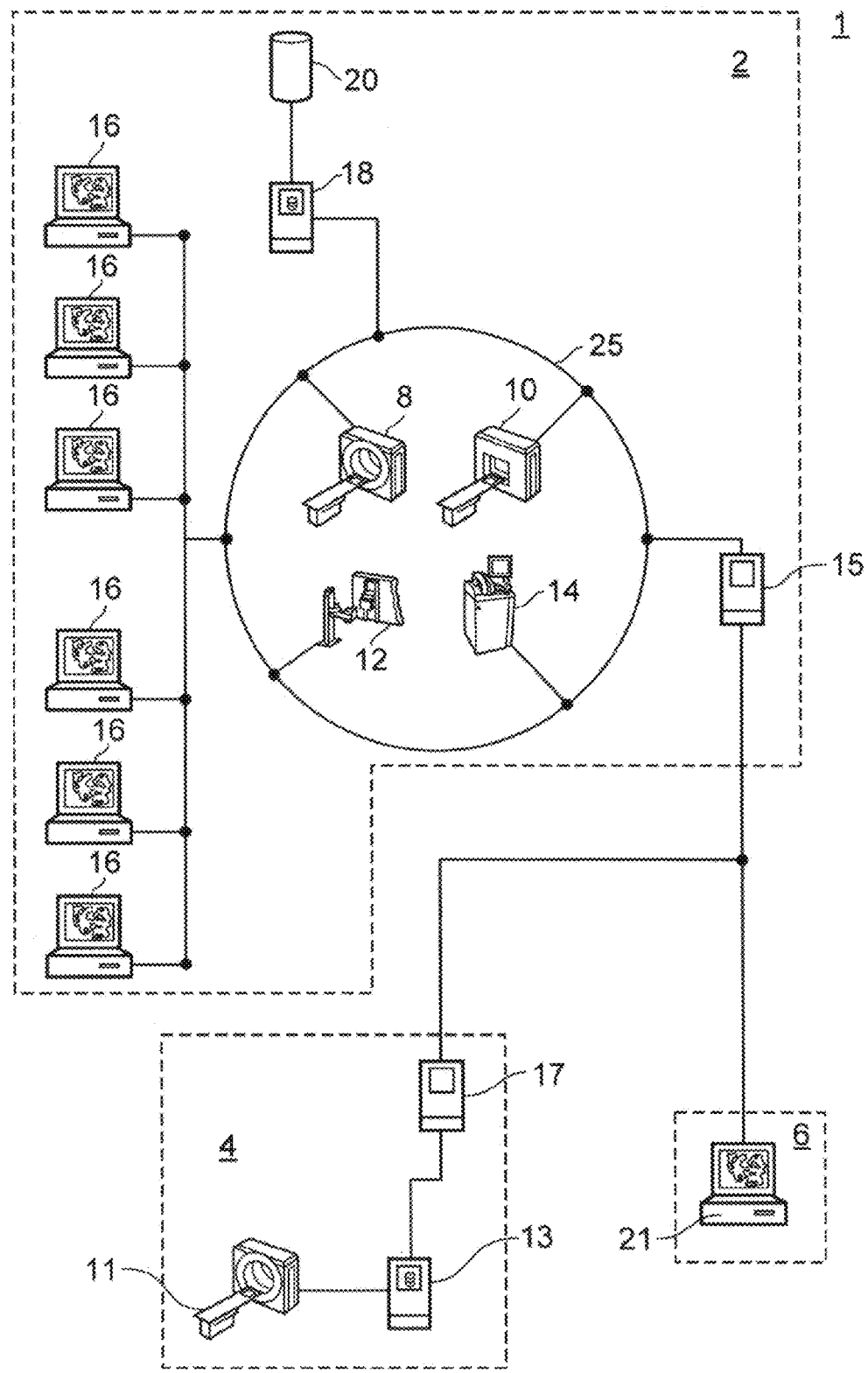
FIG. 14 is a schematic diagram showing an exemplary network of diagnostic devices and associated equipment.

FIG. 14 is a schematic representation of an exemplary network 1 of computer controlled diagnostic devices, stand-alone computer workstations and associated equipment. The network 1 comprises three components. There is a main hospital component 2, a remote diagnostic device component 4 and a remote single user component 6. The main hospital component 2 comprises a plurality of diagnostic devices for acquiring patient images, in this example, a CT scanner 8, a MR imager 10, a digital radiography (DR) device 12 and a computed radiography (CR) device 14, a plurality of computer workstations 16, a common format file server 18, a file archive 20 and an internet gateway 15. All of these features are inter-connected by a local area network (LAN) 25. It will be understood that each computer apparatus has at least one network output connection for communicating over the network.

The remote diagnostic device component 4 comprises a CT scanner 11, a common format file server 13 and an internet gateway 17. The CT scanner 11 and file server 13 are commonly connected to the internet gateway 17, which in turn is connected via the internet to the internet gateway 15 within the main hospital component 2.

The remote single user component 6 comprises a computer workstation 21 with an internal modem (not shown). The computer workstation 21 is also connected via the internet to the internet gateway 15 within the main hospital component 2.

The network 1 is configured to transmit data within a standardized common format. For example, the CT scanner 8 initially generates a source data set, i.e. a 3D image data set, from which an operator may derive an appropriate 2D image. The 2D image is encoded in a standard image data format and transferred over the LAN 25 to the file server 18 for storage on the file archive 20. A user working on one of the computer workstations 16 may subsequently request the image, the file server 18 will retrieve it from the archive 20 and pass it to the user via the LAN 25. Similarly, a user working remotely from the main hospital component 2, either within the remote diagnostic device component 4, or the remote single user component 6, may also access and transmit data stored on the archive 20, or elsewhere on the network 1.

Figure 15:
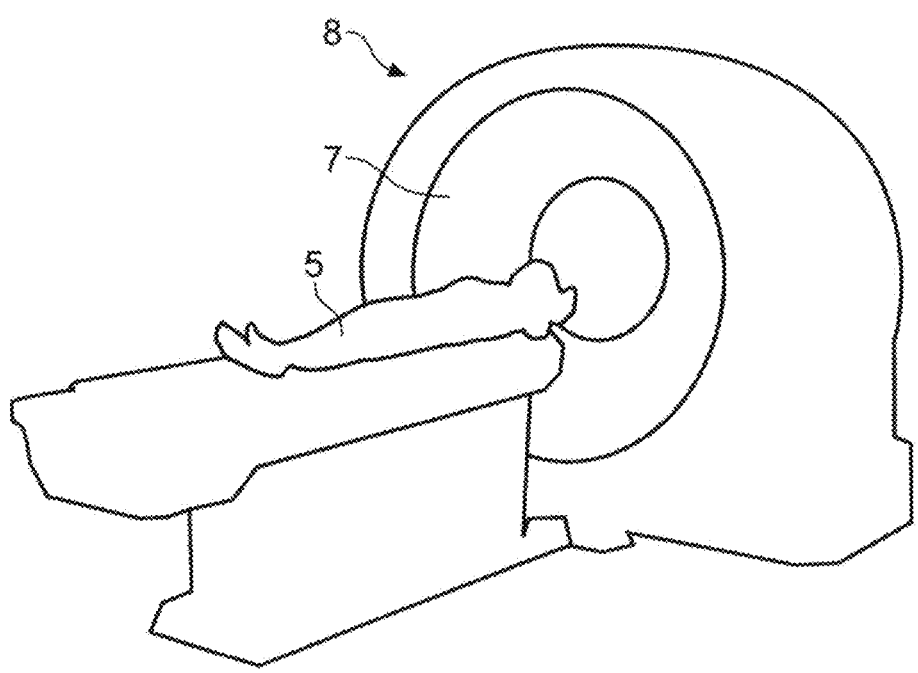
FIG. 15 shows a generic CT scanner for generating volume data.

FIG. 15 is a schematic perspective view of a generic scanner, most especially a computer-assisted tomography (CT) scanner 8 such as represented in FIG. 14, for obtaining cross-sectional images on X-ray attenuation associated with a region of a patient 5 within an opening 7 of the scanner 8. Different imaging modalities (e.g. CT, MR, PET, ultrasound) may be used to provide different types of medical image data.

With reference to FIGS. 14 and 15, the rendering application embodying the invention may be resident on any of the computer apparatuses shown, namely the workstations 6, 16, the servers 13, 15, 17, 18 or the computers and any associated graphics processing hardware associated with the scanners 8, 10, 11, 12, 14.

Figure 16A:
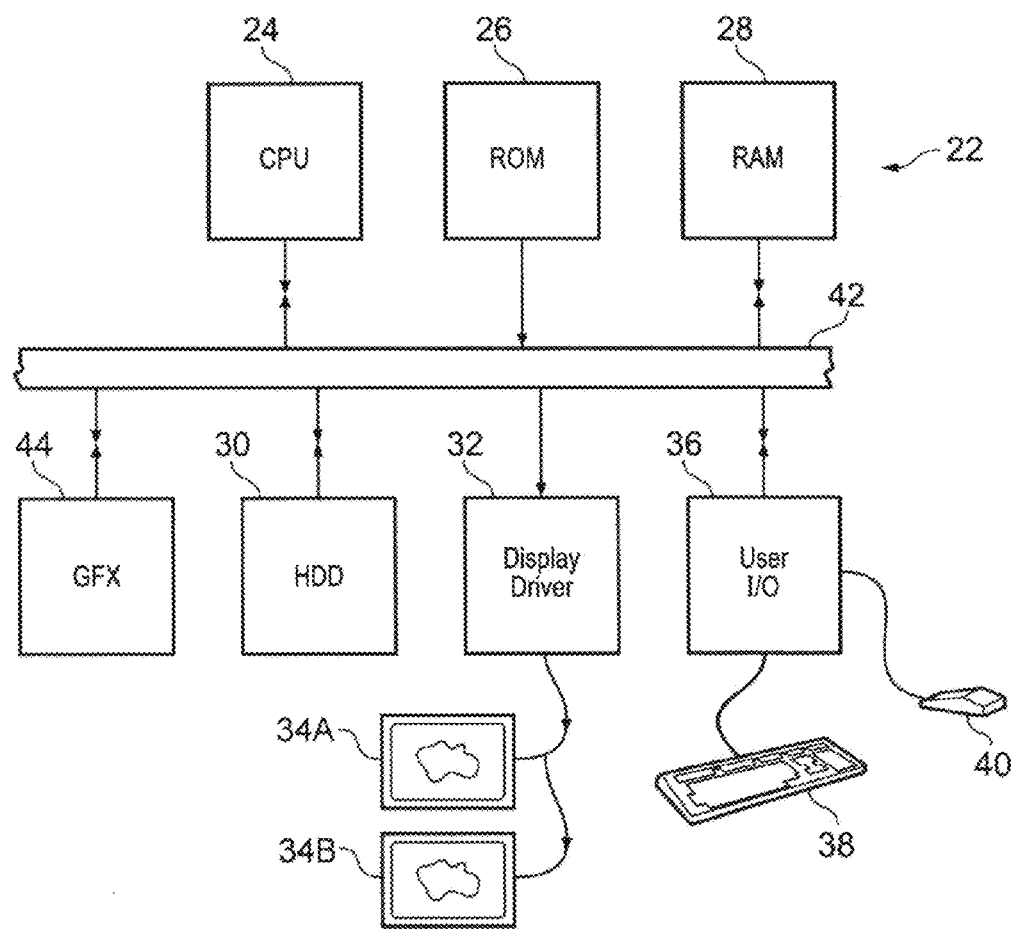
FIGS. 16A and 16B schematically show a computer system for processing image data in accordance with an embodiment of the invention.
Figure 16B:
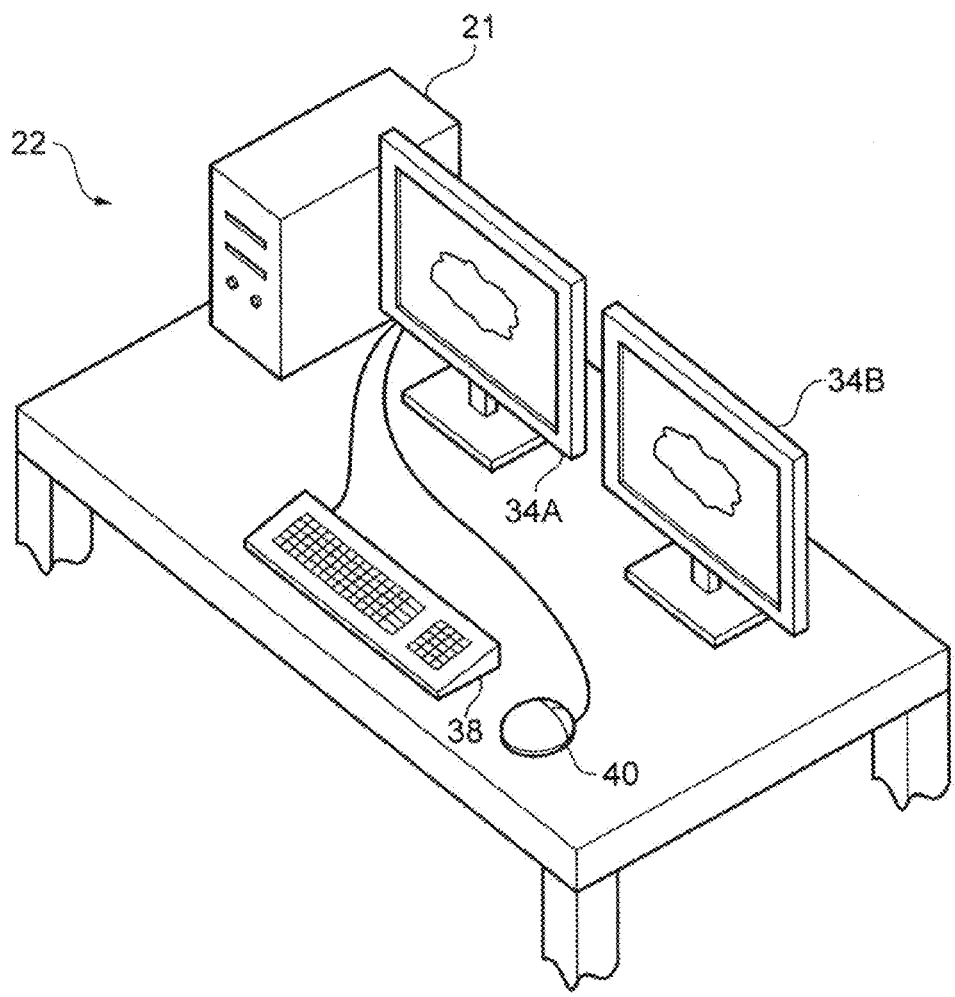

FIGS. 16A and 16B schematically illustrate a general purpose computer system 22 configured to perform processing in accordance with an embodiment of the invention. FIG. 16A primarily represents the functional units comprising the computer system 22 while FIG. 16B is a schematic perspective view showing the computer system 22 arranged for use.

The computer 22 includes a central processing unit (CPU) 24, a read only memory (ROM) 26, a random access memory (RAM) 28, a hard disk drive 30, a display driver 32, and two displays 34, namely a first display 34A and a second display 34B, and a user input/output (IO) circuit 36 coupled to a keyboard 38 and mouse 40. These devices are connected via a common bus 42. The computer 22 also includes a graphics card 44 connected via the common bus 42. The graphics card includes a graphics processing unit (GPU) and random access memory tightly coupled to the GPU (GPU memory).

The CPU 24 may execute program instructions stored within the ROM 26, the RAM 28 or the hard disk drive 30 to carry out processing, display and manipulation of medical image data that may be stored within the RAM 28 or the hard disk drive 30. The RAM 28 and hard disk drive 30 are collectively referred to as the system memory. The CPU 24 may also execute program instructions corresponding to an operating system of the computer system 22. In this respect, the CPU may be considered to comprise various functional units for performing tasks associated with the operation of the computer system 22. The GPU may also execute program instructions to carry out processing image data passed to it from the CPU.

Various functional elements comprising the computer system 22, such as the CPU 24, ROM 26, RAM 28, hard disk 30, display driver 32, user input/output (IO) circuit 36, graphics card 44 and connection bus 42 are contained in an enclosure 21. The two displays 34A, 34B, keyboard 38 and mouse 40 are in this case separate from the enclosure with appropriate wiring connecting them back to the relevant functional elements of the computer system in the enclosure 21. In this respect the computer system 22 of the example embodiment in FIGS. 16A and 16B may be considered as being of a desktop type, although other types of computer system could equally be employed.

Figure 17:
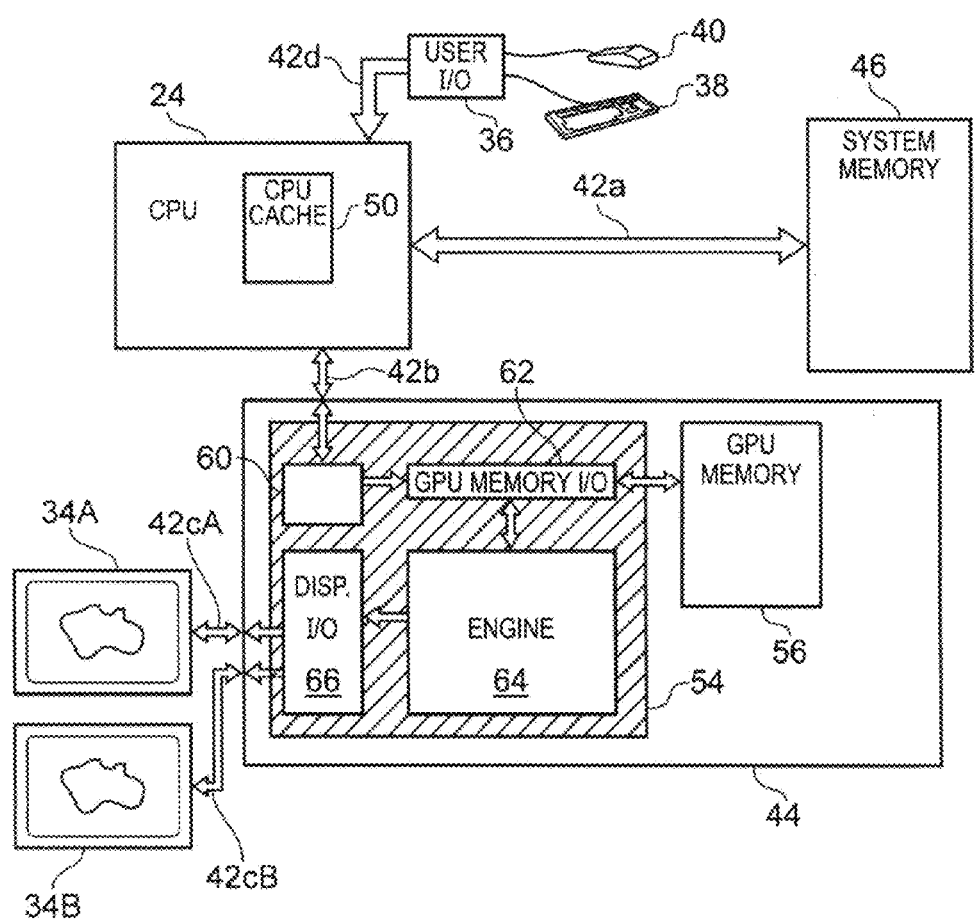
FIG. 17 schematically shows some of the features of the computer system of FIG. 3 in more detail.

FIG. 17 schematically shows some of the features of the computer system 2 shown in FIGS. 16A and 16B in more detail. The RAM 28 and hard disk drive 30 are shown collectively as a system memory 46. Medical image data obtained from the scanner 8 shown in FIG. 15 is stored in the system memory as shown schematically in the figure. To assist in showing the different data transfer routes between features of the computer system 22, the common bus 42 shown in FIG. 16A is schematically shown in FIG. 17 as a series of separate bus connections 42a-d. One bus connection 42a connects between the system memory 46 and the CPU 24. Another bus connection 42b connects between the CPU 24 and the graphics card 44. A further pair of bus connections, namely a first bus connection 42cA and a second bus connection 42cB, connects between the graphics card 44 and respective ones of the displays 34A, 34B. Another bus connection 42d connects between the user I/O circuit 36, cursor control unit 27 and the CPU 24. The CPU includes a CPU cache 50. The graphics card 44 includes a GPU 54 and a GPU memory 56. The GPU 54 includes circuitry for providing an accelerated graphics processing interface 60, a GPU cache I/O controller 62, a processing engine 64 and a display I/O controller 66. The processing engine 64 is designed for optimized execution of the types of program instructions typically associated with processing medical image data sets.

A user is able to select desired processing parameters using the keyboard 38 and mouse 40 (or other pointing device, such as a track pad or pen tablet/digitizer) in combination with a graphical user interface (GUI) displayed on the display 34, for example using a movable screen cursor in combination with the mouse, track pad etc. to point and click within respective ones of the first and second displays 34A, 34B. In particular, the GUI of the rendering application may provide the user with a drawing tool to identify the location and extent of the virtual light source. For example, the user could entirely freely draw the virtual light source with a paint-type function. Another example would be where the user through the GUI could select a segmented region and then manipulate it, e.g. by shrinking, dilating, translating or rotating, to form the virtual light source.

With reference to FIGS. 16A, 16B and 17, the rendering application embodying the invention may be stored on HDD 30 and/or ROM 26. When the application is to be run, it can as necessary be loaded into system memory 46 or RAM 28. At run time, faster memory such as cache memory 50, 62 available to the CPU 24 and GPU 54, will also host some of the application. The images output from the rendering application can be displayed on suitable displays, such as first and second displays 34A, 34B. The images output from the rendering application can also be stored in suitable memory. The images output from the rendering application can also be transmitted over the network to be displayed or stored at another location in the network.

In the above references to volume rendering and rendering application we do not wish to imply limitation to any particular type of volume rendering and we specifically mean to include any suitable non-intensity based projection modes. For example, the method can be used for color volume rendering, which is sometimes also called shaded volume rendering. The method can also be applied to slabbed volume rendering where the volume rendering is clipped by two planes to create a slab.

Moreover, references to three-dimensional image data sets includes sequences of three dimensional image data sets, such as produced by time-resolved imaging which are sometimes referred to as four-dimensional image data sets.

Certain embodiments of the invention provide a computer program product, which may be a non-transitory computer program product, bearing machine readable instructions for carrying out the method.

Certain embodiments of the invention provide a computer system loaded with and operable to execute machine readable instructions for carrying out the method.

Certain embodiments of the invention provide an image acquisition device loaded with and operable to execute machine readable instructions for carrying out the method.

Embodiments of the present invention will be described hereinafter and in the context of a computer-implemented system, method and computer program product which may be stored on a non-transitory medium. Although some of the present embodiments are described in terms of a computer program product that causes a computer, for example a personal computer or other form of workstation, to provide the functionality required of some embodiments of the invention, it will be appreciated from the following description that this relates to only one example of some embodiments of the present invention. For example, in some embodiments of the invention, a network of computers, rather than a stand-alone computer, may implement the embodiments of the invention. Alternatively, or in addition, at least some of the functionality of the invention may be implemented by means of special purpose hardware, for example in the form of special purpose integrated circuits (e.g., Application Specific Integrated Circuits (ASICs)).

While certain embodiments have been described, these embodiments have been presented by way of example only, and are not intended to limit the scope of the inventions. Indeed, the novel methods, computers and computer program products and devices described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A computer apparatus comprising: a memory; a processor; a display; a network output connection and a rendering application loaded in the memory operable to cause the computer apparatus to:
    load a three-dimensional patient image data set of voxels that includes a region of tissue of interest, which forms a scene for processing by the rendering application;
    assign one or more of the voxels to act as a light source and determine the region of the tissue of interest, wherein the light source is assigned such that the determined region of tissue of interest is located between the light source and a view point or a view plane;
    render an image of the scene from a perspective of the view point or the view plane by calculating how light emitted from the assigned light source voxel(s) travels through the tissue of interest to the view point or the view plane using an optical model which includes absorption and scattering; and
    show the image on the display and/or store the image in the memory and/or output the image to the network output connection.

2. The computer apparatus of claim 1, wherein the absorption is calculated using an absorption function which has color dependent absorption parameters.

3. The computer apparatus of claim 2, wherein the color dependent absorption parameters provide stronger absorption for blue and green color components than for a red color component.

4. The computer apparatus of claim 2, wherein:
    the three-dimensional image data set includes a first data set scanned by a first scanner and a second data set scanned by a second scanner, and
    the computer apparatus is further configured to determine a position of the region of tissue of interest based on the first data set, and determine a color of the region of tissue of interest based on the second data set.

5. The computer apparatus of claim 1, wherein
    the computer apparatus is further configured to determine a surface of the region of tissue of interest, and
    the light source is assigned along with the determined surface.

6. The computer apparatus of claim 1, wherein the rendering comprises:
    a pre-computation, which is independent of the view point or the view plane, to calculate for each voxel an amount of light received from the light source and a direction of incidence, followed by a computation of irradiance reaching the view point or the view plane, so that movement of the view point or the view plane during a session re-uses the pre-computation.

7. The computer apparatus of claim 1, wherein for the rendering of the assigned light source voxels are treated as transparent and do not contribute to scattering or absorption.

8. The computer apparatus of claim 1, further comprising: a plurality of light source voxels which are distributed over a volumetric region.

9. The computer apparatus of claim 1, wherein the assigned light source voxels are assigned based on a segmentation of the patient image data set.

10. The computer apparatus of claim 1, wherein the assigned light source voxels are assigned with reference to a lumen center line.

11. The computer apparatus of claim 1, wherein the region of tissue of interest is hollow, the assigned light source voxels lie inside the region, and the view point or the view plane is located outside the region so that the light source is obscured by the tissue of interest.

12. The computer apparatus of claim 1, wherein the region of tissue of interest is hollow, the assigned light source voxels lie outside the region, and the view point or the view plane is located inside the region so that the light source is obscured by the tissue of interest.

13. The computer apparatus of claim 1, wherein the assigned light source voxels are assigned by input from a graphical user interface.

14. The computer apparatus of claim 1, wherein the computer apparatus is further configured to:
    provide at least one additional light source remote from the tissue of interest to provide general illumination of the scene.

15. A computer-automated method for computing images from a patient image data set, the method comprising:
    running a rendering application on a computer apparatus;
    loading a three-dimensional patient image data set of voxels that includes a region of tissue of interest, which forms a scene for processing by the rendering application;
    assigning one or more of the voxels to act as a light source and determining the region of the tissue of interest, wherein the light source is assigned such the determined region of tissue of interest is located between the light source and a view point or a view plane; and
    rendering an image of the scene from a perspective of the view point or the view plane by calculating how light travels from the assigned light source voxel(s) through the tissue of interest to the view point or the view plane using an optical model which includes scattering and absorption; and
    displaying and/or storing the image.

16. An image acquisition device loaded with and operable to execute the rendering application of claim 15.

17. The method of claim 15, wherein the absorption is calculated using an absorption function which has color dependent absorption parameters.

18. The method of claim 17, wherein the color dependent absorption parameters provide stronger absorption for blue and green color components than for a red color component.

19. The method of claim 15, wherein the rendering comprises:
    using a pre-computation, which is independent of the view point or the view plane, to calculate for each voxel an amount of light received from the light source and a direction of incidence, followed by a computation of irradiance reaching the view point or the view plane, so that movement of the view point or the view plane during a session re-uses the pre-computation.

20. The method of claim 15, further comprising:
    distributing a plurality of light source voxels over a volumetric region.

21. The method of claim 15, wherein the assigned light source voxels are assigned based on a segmentation of the patient image data set.

22. A non-transitory computer readable medium having a computer program recorded thereon, the computer program configured to perform a method when executed on a computer, the method comprising:
    running a rendering application on a computer apparatus;

loading a three-dimensional patient image data set of voxels that includes a region of tissue of interest, which forms a scene for processing by the rendering application;

assigning one or more of the voxels to act as a light source and determining the region of the tissue of interest, wherein the light source is assigned such that the determined region of tissue of interest is located between the light source and a view point or a view plane; and rendering an image of the scene from a perspective of the view point or the view plane by calculating how light travels from the assigned light source voxel(s) through the tissue of interest to the view point or the view plane using an optical model which includes scattering and absorption; and displaying and/or storing the image.

* * * * *